Patented Oct. 29, 1935

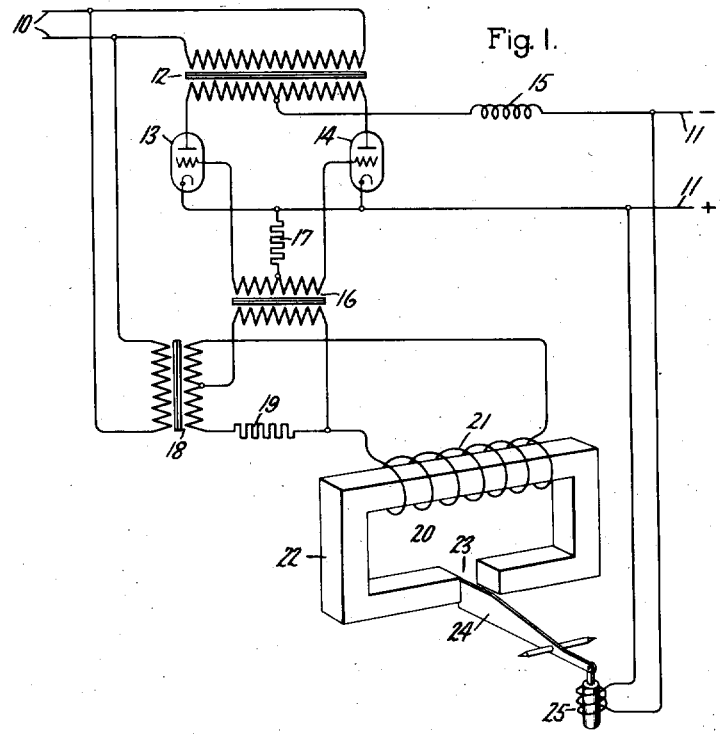
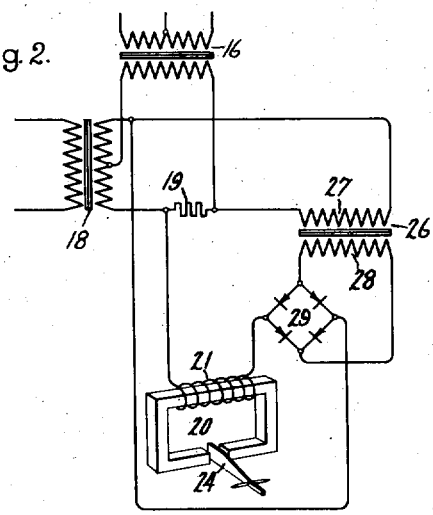
Inventors:
Louis W. Thompson,
George L. Rogers,
by Charles E. Tullar
Their Attorney.

2,019,328

UNITED STATES PATENT OFFICE 2,019,328

ELECTRIC TRANSLATING CIRCUITS

Louis W. Thompson and George L. Rogers, Schenectady, N. Y., assignors to General Electric Company, a corporation of New York Application December 31, 1931, Serial No. 584,076

8 Claims. (Cl. 175—363)

Our invention relates to electric regulating systems and more particularly to such systems including an electric valve for regulating the energy transmitted between an alternating current supply circuit and a direct or alternating current load circuit.

Heretofore it has been proposed to transmit energy from an alternating current circuit to a direct or alternating current load circuit by means of electric valves and to regulate an electrical condition of the load circuit by impressing upon the grids of the electric valves alternating potentials variable in phase with respect to their anode potentials. Our invention relates to an electric regulating system of this type.

It is an object of our invention to provide an improved electric regulating system including an electric valve for transmitting energy from an alternating current circuit to a direct or alternating current load circuit, which is simple and reliable in operation, and by means of which an electrical condition of the load circuit may be regulated with any degree of accuracy desired.

It is another object of our invention to provide an improved translating circuit for producing an alternating potential variable in phase with respect to that of an alternating current source, which is of general application but which is particularly suitable for use in connection with our improved regulating system.

In accordance with one embodiment of our invention, a load circuit is connected to be energized from an alternating current circuit through a pair of electric valves. There is provided an impedance phase shifting circuit energized from the alternating current circuit for producing an alternating potential variable in phase with respect to that of the source. This impedance phase shifting circuit includes a reactor having a closed circuit conductive element included in its magnetic path. The position of this short circuiting element determines the reactance of the reactor and thus the phase of the alternating potential supplied to the grids of the electric valves. There is also provided means responsive to an electrical condition of the load circuit for controlling the position of the closed circuit element so that this particular electrical condition of the load circuit may be automatically regulated in any desired manner. In accordance with a modification of our invention, the sensitivity of the apparatus is somewhat increased by replacing the reactor described above in the phase shifting circuit with a saturable reactor, the saturating winding of which is energized from the alternating current circuit through a rectifier and a reactor of the type described above, the control of this latter reactor being the same as in the first described modification.

For a better understanding of our invention, together with other and further objects thereof, reference is had to the following description taken in connection with the accompanying drawing and its scope will be pointed out in the appended claims. Fig. 1 of the drawing illustrates an electric regulating system embodying our invention for supplying a direct current load circuit from an alternating current supply circuit and maintaining substantially constant the voltage of the direct current load circuit, while Fig. 2 illustrates a modification of the arrangement shown in Fig. 1 for producing an alternating potential variable in phase for the excitation of the electric valves.

Referring now to the drawing, there is illustrated in Fig. 1 an arrangement for transmitting energy from an alternating current supply circuit 10 to a direct current load circuit 11. This apparatus comprises a transformer 12 provided with a primary winding connected to the supply circuit 10 and a secondary winding provided with an electrical midpoint connected to one side of the load circuit 11 and end terminals connected to the other side of the circuit 11 through a pair of electric valves 13 and 14, the connections being made in a well known manner to provide full wave rectification. A smoothing reactor 15 is preferably included in the direct current circuit 11. Electric valves 13 and 14 are each provided with a cathode, an anode and a control grid, and may be of any of the several types well known in the art, although I prefer to use valves of the vapor electric discharge type because of the relatively large amounts of power which may be handled at ordinary operating voltages. In order to control the average conductivity of the valves 13 and 14 and thus the average voltage of the direct current circuit 11, the grids of these valves are connected to their common cathode circuit through opposite halves of the secondary winding of a grid transformer 16 and a current limiting resistor 17. The primary winding of the grid transformer 16 is energized from the alternating current circuit 10 through a transformer 18 and an impedance phase shifting circuit comprising a resistor 19 and a reactor 20, the connections of the primary winding of the transformer 16 being from the electrical midpoint of the secondary winding of the transformer 18 to the junction between the resistor 19 and reactor 20. The reactor 20 comprises an impedance winding 21 and a magnetic core member 22 provided with an air gap 23. The reactor 20 is provided with a closed circuit conductive element in its magnetic path. This conductive element may be of any several types well known in the art, although we have illustrated by way of example a pivotally mounted conductive vane 24 mounted in such a way as to extend into the air gap 23 and provide a path for induced eddy currents, the effect of which is to change the reluctance of said magnetic path thereby to reduce the impedance of the winding 21, as is well understood by those skilled in the art. The position of the member 24 is controlled by a solenoid operating mechanism 25 energized from the direct current load circuit 11.

The general principles of operation of a controlled rectifier of the type described above will be well understood by those skilled in the art or may be found explained in detail in U. S. Letters Patent No. 1,654,949, granted January 3, 1928, upon the application of P. M. G. Toulon. In brief, however, when the alternating potentials applied to the grids of the valves 13 and 14 are in phase with their anode potentials, each electric valve is conductive during its respective half cycle of positive anode potential, and the average voltage supplied to the direct current circuit 11 is a maximum. If, however, the alternating potentials supplied to the grids 13 and 14 are retarded in phase with respect to their anode potentials, each electric valve becomes conductive at a later point in its respective half cycles of positive anode potential, and the average voltage supplied to the circuit 11 is reduced. The function of the reactor 15 is, obviously, to maintain a substantially constant current flow and to absorb the instantaneous differences between the voltage supplied by the rectifier comprising the transformer 12 and the valves 13 and 14 and the constant voltage which it is desired to maintain on the circuit 11.

In explaining the operation of the above described regulating apparatus, it will be assumed that the voltage of the circuit 11 momentarily drops below normal, due to an increase in load or other cause. The energization of the solenoid 25 decreases, allowing the vane 24 to rise in the gap 23 and decrease the reactance of reactor 20. The result of a decrease in the reactance of the element 20 is to advance the phase of the alternating potentials supplied to the grids of the valves 13 and 14 and thus increase the average voltage impressed upon the direct current circuit 11 to bring it back to its normal value. Obviously, an increase in voltage on the circuit 11 results in a similar operation to retard the phase of the grid potentials of the several valves.

In Fig. 2 there is illustrated a modification of the impedance phase shifting circuit illustrated in Fig. 1, by means of which the sensitivity of regulation may be increased. In this arrangement, the reactor 20 in the phase shifting circuit is replaced by a saturable reactor 26 provided with an impedance winding 27 and a saturating winding 28. The winding 28 is adapted to be energized from the transformer 18 through the winding 21 of reactor 20 and a rectifier bridge 29. The operation of the apparatus when utilizing this type of phase shifting circuit is substantially similar to that described above. A decrease in the impedance of the winding 21 in series with the saturating winding 28 causes an increased saturation of the reactor 26 and a decreased impedance of the winding 27 to advance the phase of the grid potentials, and vice versa. In this arrangement, the saturable reactor 26 operates to amplify variations in the reactance of reactor 20.

While we have described what we at present consider preferred embodiments of our invention, it will be obvious to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States, is,—

1. In an electric regulating system, means having an operating condition to be regulated, means for regulating said operating condition including an electric valve and a source of alternating current, means for varying the conductivity of said valve including an inductive winding provided with a closed circuit non-magnetic conductive element in its magnetic path, and means independent of the current in said winding and responsive to said operating condition for varying the position of said conductive element whereby the reluctance of said magnetic path is altered.

2. In an electric regulating system, means having an operating condition to be regulated, means for regulating said condition including a source of alternating current and an electric valve provided with a control electrode, means for energizing said electrode from said source including a saturable reactor provided with a saturating winding, means for energizing said saturating winding including a serially connected reactor provided with a closed circuit conductive element in its magnetic path, and means responsive to an electrical condition of one of said circuits for varying the position of said conductive element whereby the reluctance of said magnetic path is altered.

3. In combination, an alternating current supply circuit, a load circuit, means for transmitting energy therebetween including an electric valve provided with a control grid, means for energizing said grid from said alternating current circuit including a reactor provided with an air gap, a conductive vane mounted in said gap, and means for varying the position of said vane in response to variations in an electrical condition of one of said circuits.

4. In combination, an alternating current supply circuit, a load circuit, means for transmitting energy therebetween including an electric valve provided with a control grid, means for exciting said grid including a resistor and a reactor serially connected across said alternating current circuit, said reactor being provided with a conductive vane in its magnetic path, and means responsive to an electrical condition of one of said circuits for varying the effect of said vane.

5. In combination, an alternating current supply circuit, a load circuit, means for transmitting energy therebetween including an electric valve provided with a control electrode, means for exciting said electrode including a plurality of impedance elements connected across said alternating current circuit for producing dephased potentials, means for varying the impedance of one of said elements including a reactor provided with a movable closed circuit non-magnetic conductive element in its magnetic path, and means responsive to an electrical condition of one of said circuits for varying the position of said conductive element.

6. In combination, an alternating current supply circuit, a load circuit, means for transmitting energy therebetween including an electric valve provided with a control grid, means for exciting said grid comprising a resistor and a saturable reactor connected across said alternating current circuit for producing dephased potentials, a saturating winding for said reactor, means for energizing said saturating winding from said alternating current circuit including a second reactor provided with a conductive vane in its magnetic path, and a solenoid operating mechanism for varying the position of said vane in accordance with an electrical condition of one of said circuits.

7. In combination with an electric translating circuit including a source of alternating current, means for producing a periodic potential variable in phase with respect to that of said source in response to variations in an electrical condition of said circuit comprising a serially connected resistor and reactor energized from said source, said reactor being provided with a closed circuit non-magnetic conductive element in its magnetic path, and means responsive to said electrical condition of said circuit for varying the position of said conductive element.

8. In combination with an electric translating circuit including a source of alternating current, means for producing a periodic potential variable in phase with respect to that of said source in response to variations in an electrical condition of said circuit comprising a serially connected resistor and reactor energized from said source, said reactor being provided with a conductive vane in its magnetic path, and a solenoid operating mechanism energized in accordance with said electrical condition for varying the position of said vane.

LOUIS W. THOMPSON.
GEORGE L. ROGERS.